(12) United States Patent
Postma et al.

(10) Patent No.: US 6,378,455 B1
(45) Date of Patent: Apr. 30, 2002

(54) INTELLIGENT CLAW

(75) Inventors: Ebele Marten Postma, Barchem; Albertino Bernardo Maria Verstege, Aalten; Otto Theodorus Jozef Zents, Lichtenvoorde; Derk Jan Roosenboom, Haaksbergen, all of (NL)

(73) Assignee: N.V. Nederlandsche Apparatenfabrik NEDAP, De Groenlo (NL)

( * ) Notice: Subject to any disclaimer, the term of this patent is extended or adjusted under 35 U.S.C. 154(b) by 0 days.

(21) Appl. No.: 09/529,120

(22) PCT Filed: Oct. 13, 1998

(86) PCT No.: PCT/NL98/00587

§ 371 Date: Apr. 7, 2000

§ 102(e) Date: Apr. 7, 2000

(87) PCT Pub. No.: WO99/18774

PCT Pub. Date: Apr. 22, 1999

(30) Foreign Application Priority Data

Oct. 13, 1997 (NL) .............................................. 1007266
Oct. 23, 1997 (NL) .............................................. 1007344

(51) Int. Cl.⁷ .................................................. A01J 3/00
(52) U.S. Cl. .................................................. 119/14.08
(58) Field of Search ......................... 119/14.08, 14.14, 119/14.18

(56) References Cited

U.S. PATENT DOCUMENTS

| | | | |
|---|---|---|---|
| 4,593,649 A | * 6/1986 | Britten | ..................... 119/14.14 |
| 5,370,112 A | 12/1994 | Perkins | ........................ 128/204 |
| 5,388,549 A | * 2/1995 | Holroyd | ................... 119/14.14 |
| 5,664,521 A | * 9/1997 | Simpson et al. | ......... 119/14.08 |
| 6,038,030 A | * 3/2000 | Van Den Berg | ......... 119/14.08 |
| 6,073,580 A | * 6/2000 | Graupner et al. | ........ 119/14.08 |

FOREIGN PATENT DOCUMENTS

| | | |
|---|---|---|
| DE | 4000039 A1 | 7/1991 |
| EP | 0424801 A1 | 5/1991 |
| WO | WO95/22888 | 8/1995 |
| WO | WO97/40374 | 10/1997 |

OTHER PUBLICATIONS

Geleidbarheidsmeting hulp bij opsporing van mastitis, Agararisch Dagblad, Jan. 16, 1992, p. 29.

* cited by examiner

Primary Examiner—Charles T. Jordan
Assistant Examiner—Elizabeth Shaw
(74) Attorney, Agent, or Firm—Jacobson Holman, PLLC

(57) ABSTRACT

A device for analyzing milk in order to determine the health of milk animals and/or the quality and composition of the milk obtained from these animals comprises a milking circuit which forms part of a milking machine and is connected to the milking cups adapted for connection to the teats of the animals. In this milking circuit sensors are disposed within a housing to determine parameters relevant to the health of the animals and/or the quality and composition of the milk. The device further comprises data processing means adapted to process signals determining these parameters and provided by the sensors and to make knowable the processing results thereof. The data processing device are arranged in or on the same housing as in which or on which the sensors themselves are arranged.

13 Claims, 4 Drawing Sheets

INTELLIGENT CLAW

A device for analyzing milk

The present invention relates to a device for analyzing milk in order to determine the health of milk animals and/or the quality and composition of the milk obtained from these animals, comprising a milking circuit which forms part of a milking machine and is connected to the milking cups adapted for connection to the teats of the animals, in which milking circuit sensors are disposed within a housing to determine parameters relevant to the health of the animals and/or the quality and composition of the milk, which device further comprises data processing means adapted to process signals determining these parameters and provided by the sensors and to make knowable the processing results thereof.

Such parameters may relate to the electric conductivity of the milk which may be an indication of mastitis, the temperature of the milk (which is higher in the fertile period of the animal, or when it has, e.g., mastitis) nearly immediately after it has been collected via the milking cups, the cell count (SCC or somatic cell count) of the milk which indicates the degree in which the milk is free from bacteria, and the content in the milk of proteins, fats, progesterone (a hormone which is less produced in the fertile period of the animal), urea, lactose, penicillin, or other antibiotics, etc.

To determine such quantities, there may be used all kinds of known per se sensors, such as conductivity sensors, temperature sensors, frequency-controlled dielectricity measuring elements, etc.

These sensors are disposed within a separate housing in the place where they can carry out relevant measurements. In practice, it is known to arrange sensors in different places in the milking circuit of the milking machine, in particular in the milk lines extending from the milking cups, in the milk claw, in a milk meter or milk gauge glass connected thereto, etc. From the sensors the signal lines extend to provide the measured data, while, furthermore, a supply line will extend to the sensors. The signal lines extend to data processing means arranged elsewhere, such as, e.g., a computer for processing the signals provided by the sensors and making knowable the processing results thereof. Such a system has the drawback that relatively long lines are necessary which are rather susceptible to trouble in a parlor in which the milking machine is installed, while in the place where the animals are milked the lines are very susceptible to damage owing to the presence of the animals; the animals may tread milking apparatus, and in particular the different lines, to pieces or tread off the milk hoses.

It is an object of the invention to remove or at least substantially reduce this drawback.

According to the invention the device as defined in the preamble is characterized in that the data processing means are arranged in or on the same housing as in which or on which the sensors themselves are arranged.

By arranging the data processing means, in particular a microprocessor with associated electronic devices, in or on the same housing as in which or on which the sensors themselves are arranged, the susceptibility to trouble can be substantially reduced. When several sensors, optionally of a different kind, are arranged in or on a housing, the number of signal lines may be substantially limited as well or even be left out completely when in or on the housing of the sensors and the data processing means there are also arranged transmitting means for transmitting the resulting data to receiving means installed elsewhere. The supply line for the data processing means may be left out as well, namely by using a supply source without such a supply line, such as, e.g., a battery or a different supply element which can be arranged at or near the data processing means.

For some of the above-mentioned parameters it is favorable if they are determined for all the udder quarters separately; this particularly applies to the electric conductivity of the milk to enable the determination of mastitis already at an early stage and the cell count. The sensors for these parameters will therefore preferably be disposed in the milk lines extending from the milking cups or in the milk claw, if at least present. In fact, the milk lines from the milking cups may be passed both directly to a milk collecting buffer, such as a milk meter or milk gauge glass, and via a milk claw from where only milk line leads to such a milk collecting buffer. For the other parameters stated it is often sufficient or even desirable that they are determined for the mixed milk, i.e. for the milk from the udder quarters together. The sensors for these parameters will therefore preferably be disposed within the milk collecting buffer or within the milk claw or the line from the milk claw to the milk collecting buffer, of course again, if such a milk claw is present. Besides, one or more different sensors may also be disposed in a milk line and also one or more sensors in a milk collecting buffer or in a milk claw. In all these cases, however, the housing for the sensors should be such that the data processing means can be arranged therein and even transmitting means and/or a supply source, if required. Of course, this should not or substantially not impede the through-flow of the milk.

In a preferred embodiment the device according to the invention is characterized in that the housing for one or more sensors and for the data processing means is formed by a milk claw. In particular, at least one sensor to be contacted with the milk from a relevant udder quarter is then arranged in or near the place where each of the milk lines from the relevant milking cups opens into the milk claw, which sensor is electrically connected to the data processing means fixed to the wall of the milk claw. Thus, in or near the place where the milk lines from the milking cups open into the milk claw, the sensors may be formed by a conductivity sensor and a temperature sensor. The conductivity sensor and the temperature sensor may then form one whole, i.e. be integrated together; the temperature sensor may be arranged, e.g., in the conductivity sensor. Through this construction not only the conductivity but the temperature of the milk from the individual udder quarters is measured. In case of an inflammation in an udder quarter, both sensors give a deviating value.

The data processing means may be arranged, in a constructionally favorable manner, on the inside of the upper wall of the milk claw, while one or more further sensors to be contacted with the mixed milk are arranged below the data processing means. In a specific exemplary embodiment each of the sensors in or near the place where the milk lines from the milking cups open into the milk claw is formed by a conductivity sensor, and the sensor arranged below the data processing means is formed by a temperature sensor.

In an alternative embodiment the data processing means are arranged on the inside of the upper wall of the milk claw, while on the side thereof, below the opening of each of the milk lines from the four milking cups into the milk claw, a sensor is arranged.

The invention not only relates to a device for analyzing milk but also to a milk claw comprising such a device.

The invention will now be explained in detail with reference to the accompanying drawings, in which FIG. 1 shows a milk claw with the device according to the invention in a first embodiment;

FIG. 3 shows the embodiment of the device according to the invention, with this device being included in the milk line between the milking cup and a milk collecting buffer, while

Figure 1:
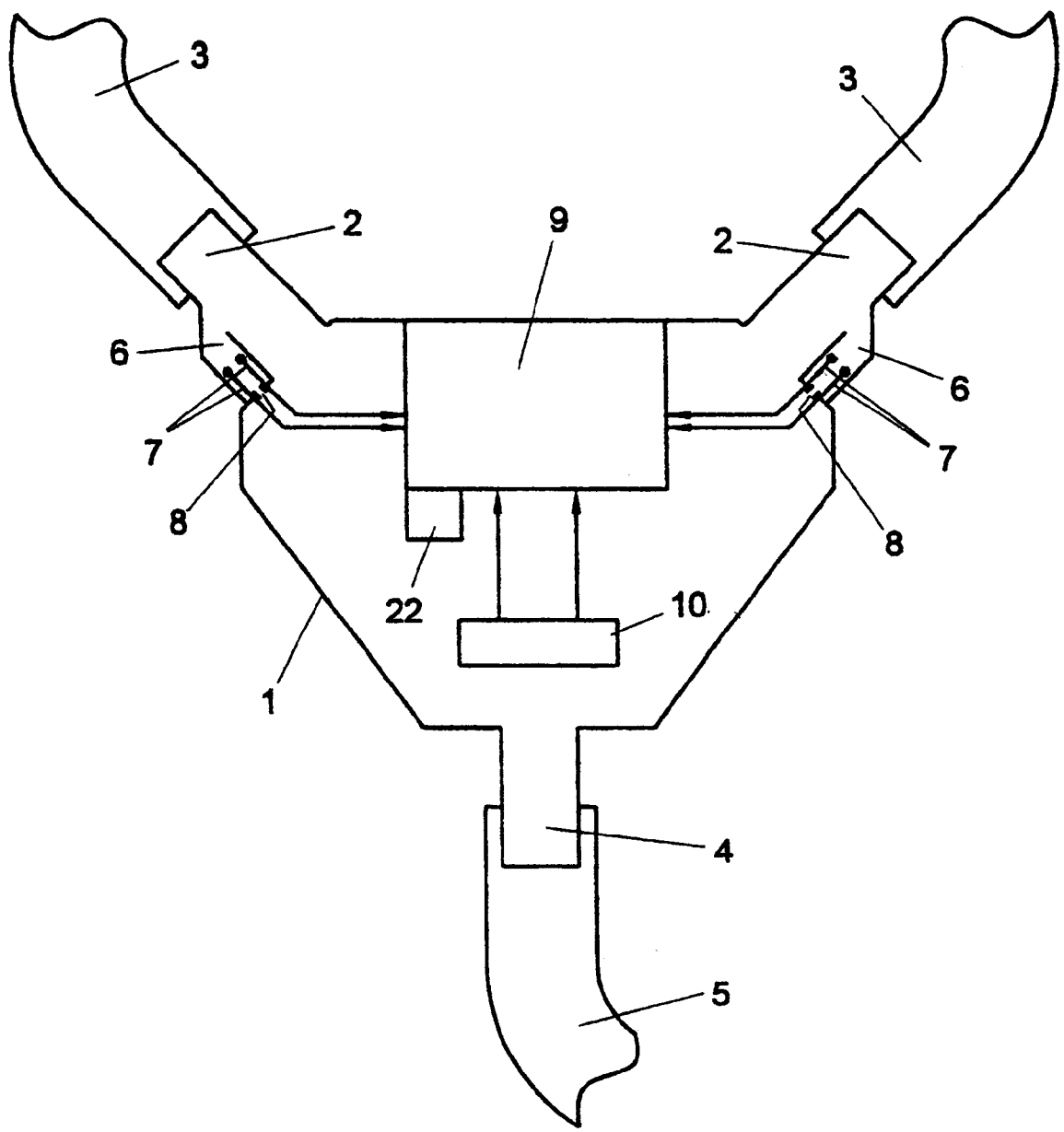
Figure 2:
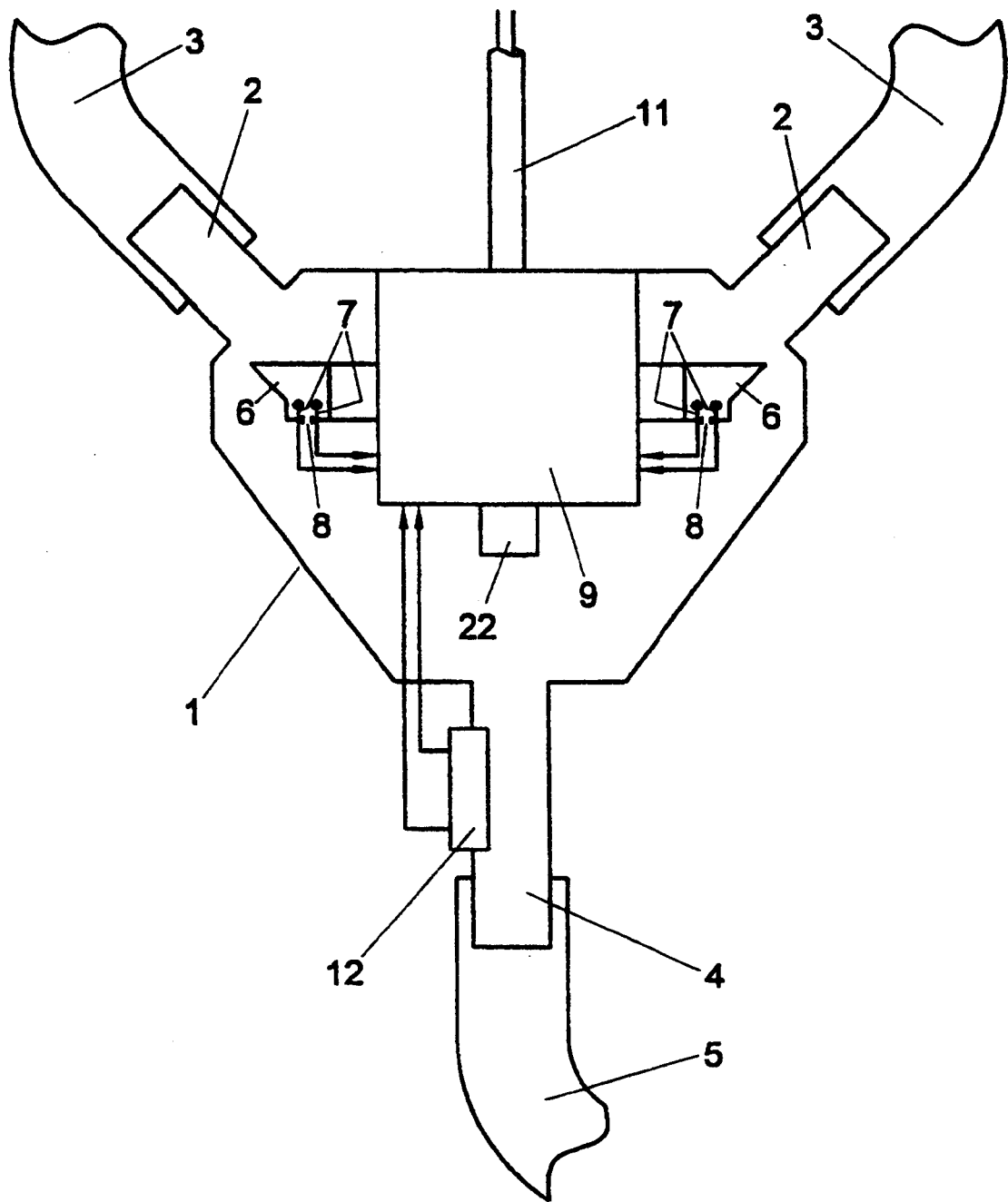
FIG. 2 shows a milk claw with such a device in a second embodiment.

For clarity's sake, the milk claw, as shown in FIGS. 1 and 2, only has two connections for a milking cup. When milking goats, this will be sufficient; when milking cows, however, a milk claw will have four of such connections, which are preferably situated symmetrically around the central body of the milk claw.

Figure 3:
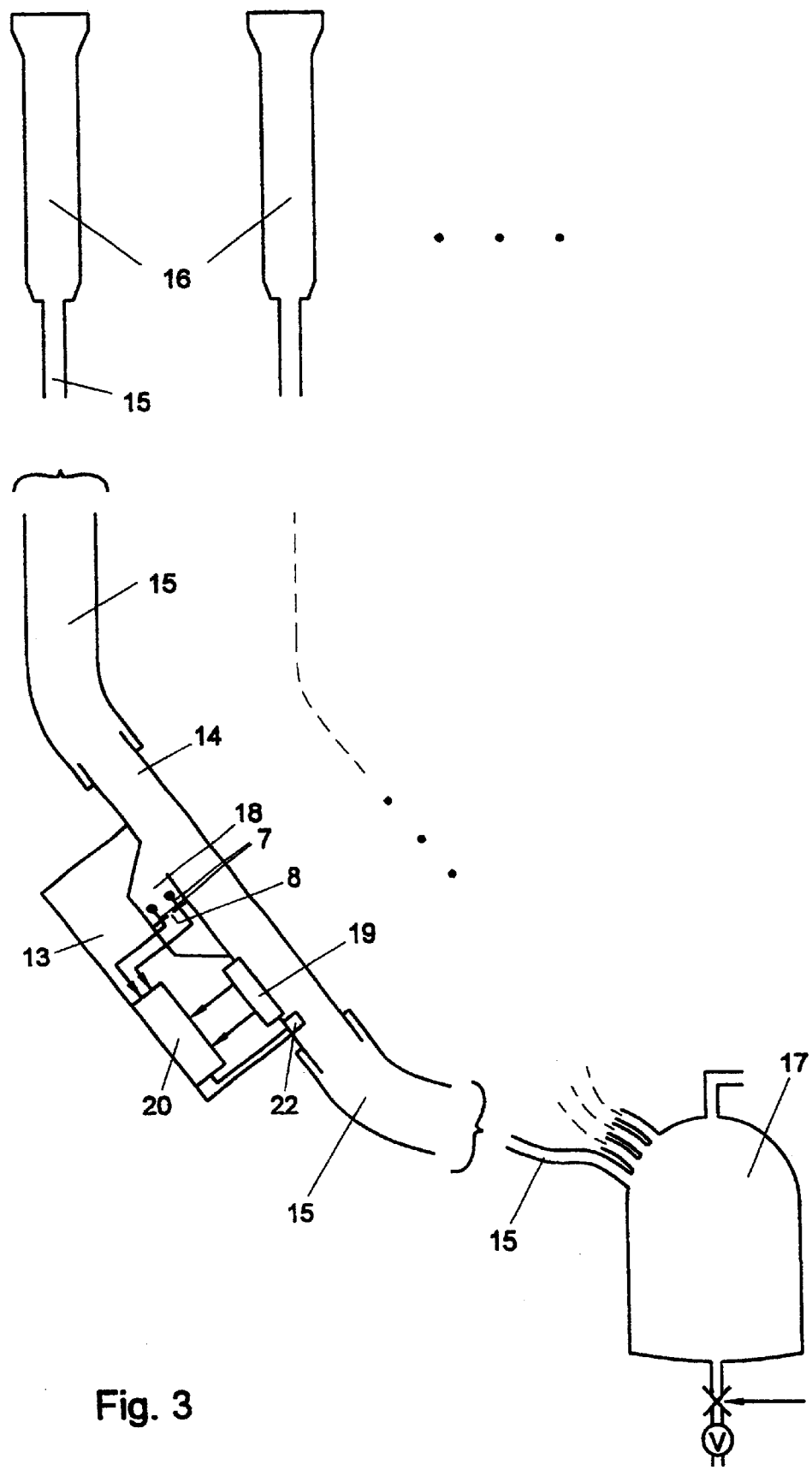
Figure 4:
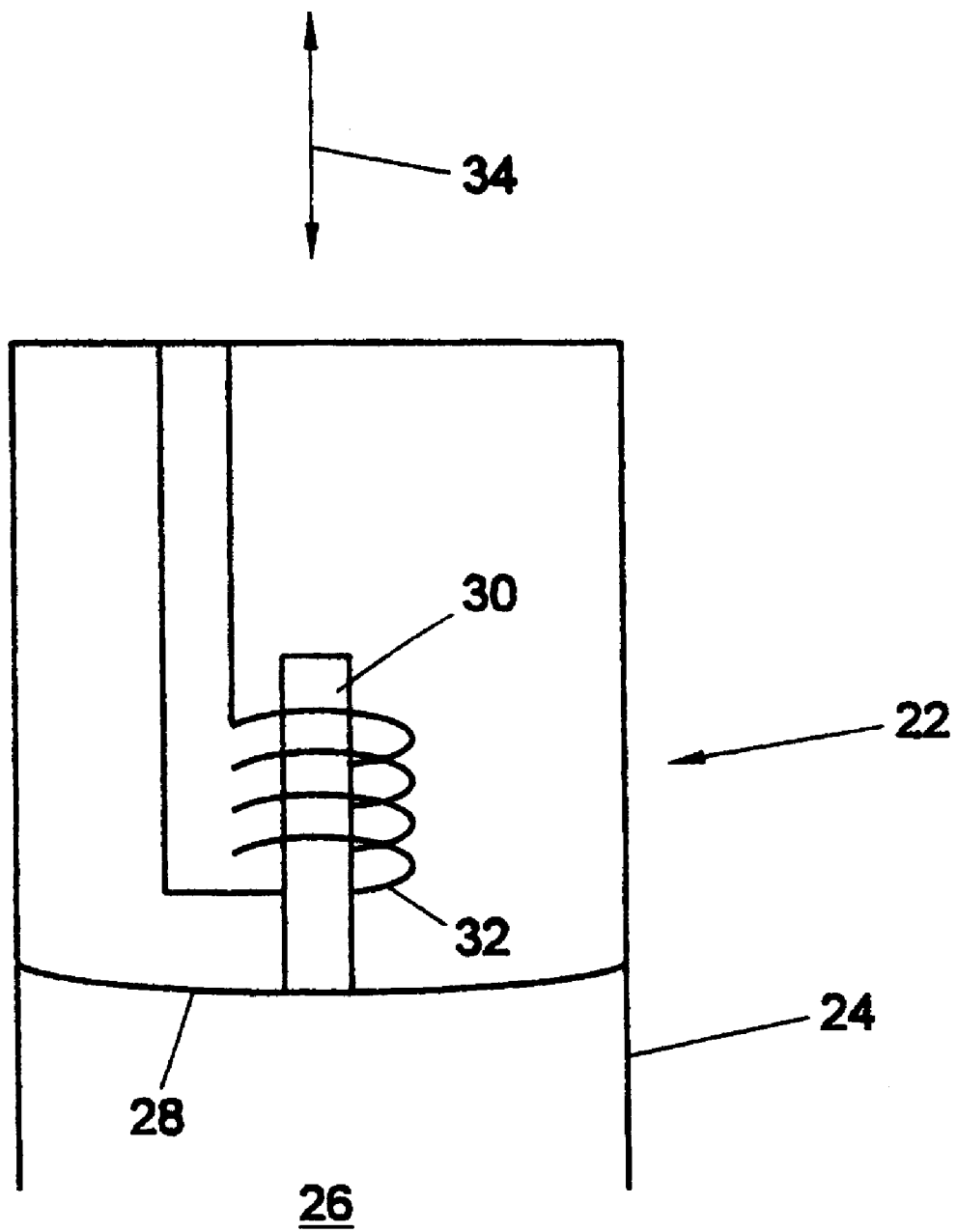
FIG. 4 shows a preferred embodiment of a supply source of the device shown in FIGS. 1–3.

Likewise, for clarity's sake, FIG. 3 shows only one of the four milk lines between a milking cup and a common milk collecting buffer.

Corresponding parts in FIGS. 1 and 2 are further indicated by the same reference numerals.

FIG. 1 shows a milk claw 1 with the device according to the invention in a first embodiment. The milk claw 1 comprises connections 2 for milk lines 3 extending from the milking cups (not shown) and from a discharge connection 4 for a discharge line 5, via which milk obtained through the milking cups from the individual udder quarters of a milk animal is commonly discharged to a milk collecting buffer (not shown) or, if required, directly to a milk tank. The milk from the individual udder quarters mixing in the milk claw 1 is designated here as mixed milk. Disposed within the connections 2 are known per se electric conductivity sensors 6, the conductivity of the milk being determined between two electrodes 7 in a space of defined size. The space is filled from the top with the milk flowing from the relevant milking cup, while at the bottom of this space a small opening 8 may be present, via which the milk can flow away. In view of the fact that these sensors have long since been known, the operation thereof need not be discussed in detail. Disposed on the inside of the upper wall of the milk claw 1 are the data processing means 9. These data processing means 9 comprise a microprocessor with associated electronic devices adapted to process and make knowable the signals from the sensors outwardly. Connected to the data processing means 9 are the electrodes 7 of the conductivity sensors 6. Within the milk claw 1 is further disposed a temperature sensor 10 connected to the data processing means 9. The signals from the four milk conductivity sensors 6 and the temperature sensor 10 are directly processed in the data processing means 9. This may be referred to as a milk analysis carried out online and on real-time basis. The conductivity values of the milk from the individual udder quarters are then compared to each other, while, moreover, these values are compared to an average value thereof over, e.g., the last ten days. Such processing of milk conductivity values is known per se, but is carried out in the known devices by means of a remotely installed general computer with the inherent drawbacks, as already indicated above. It has been found in practice that the short distance between the electrodes 7 and the data processing means 9 results in a reduced susceptibility to trouble and thus to a greater accuracy in the determination of the milk conductivity, so that mastitis, too, can be signalized in a very early stage in which it is, e.g., latently present only in one udder quarter.

Similarly, the values measured by the temperature sensor 10 may be processed and compared to the progressive average determined for them before, so that even a gradual change in the temperature of the milk and thus of the animal can already be signalized in good time. Here, too, the great advantage of the more reliable and accurate measurements is obtained through the short distance between the temperature sensor 10 and the data processing means 9. Reporting the results of the data processing outwardly may take place by means of an output cable. To optimally avoid cable work in the milking place, and in particular under the animal, the milk claw 1 comprises a transmitter which, in the figure, is disposed within the data processing means 9. Via this transmitter, deviating conductivity values of the milk from one or more of the udder quarters relative to the other udder quarters, deviations of conductivity values from the progressive average thereof, and deviations of the temperature from the progressive average thereof are transmitted to a remotely installed receiver coupled to a central computer or specific signalizing means. The data processing means 9 may also comprise a receiver for the wireless supply of information to the data processing means 9 at a distance from the milk claw by means of a transmitter. To avoid cable work, the milk claw 1 comprises a battery or a similar supply element.

But also if a supply line and a data output line are necessary, the advantage is obtained yet that the number of lines is substantially limited as compared to the situation in which individual supply lines and data output lines from the individual sensors were necessary.

In FIG. 2 a similar milk claw 1 is shown as in FIG. 1, but here the milk conductivity sensors 6 are disposed in the middle of the milk claw 1, namely below the connections 2, while, furthermore, a data output line 11 from the data processing means 9 is shown. Instead of the temperature sensor 10 connected to the data processing means, as shown in FIG. 1, a further sensor 12 is disposed here in the discharge connection 4 of the milk claw 1. The signal lines from this sensor 12 are connected to the data processing means 9 arranged at a short distance therefrom. Here, too, the sensor 12 may be formed by a temperature sensor, although this sensor, like the sensor 10 in FIG. 1, may also be formed by one of the other sensors mentioned above.

FIG. 3 shows a sensor combination with data processing means in the individual milk lines between the relevant milking cups and a common milk collecting buffer. Although four of such sensor combinations are present, only one is shown. The sensor combination 13 forms part of a through-flow line section 14 which is disposed in the milk line 15 between a relevant milking cup 16 and the common milk collecting buffer 17. The through-flow line section 14 and a part of the milk lines 15 are enlarged, for clarity's sake. The sensor combination comprises a conductivity sensor 18 of the type as already shown in FIGS. 1 and 2, a further sensor 19, and the data processing means 20. Within the data processing means there are also disposed a transmitter and a battery or a similar supply element. The sensor 19 may be a temperature sensor or one of the other sensors mentioned above.

In particular, the sensors 10, 12 and 19 may be formed by a frequency-controlled dielectric sensor, the dielectric being formed by the milk. At specific frequencies the presence of specific amounts of components in the milk, in particular fats and proteins, may be determined by measuring the capacity and conductivity between electrodes. Since such sensors are also known, the operation thereof need not be discussed in detail. Preferably, the device comprises a supply source 22 which, in use, is arranged to generate electric energy on the basis of pulsating air or gas pressure differences in the housing. These pulsating pressure differences are generated, in a manner known per se, in the housing containing the sensors, i.e. in the milking circuit of the device forming part of a milking device for milking the animals. In the example of FIGS. 1 and 2 the supply source 22 is placed in the milk claw to provide the data processing means with energy. In the example of FIG. 3 the supply source 22 is disposed in the through-flow line section 14. The supply-source 22 may consist of, e.g., a housing 24 with an opening 26 closed by a diaphragm 28. The diaphragm 28 is connected with a solid magnetic body 30 which is movably disposed within a coil 32. The pulsating air and gas pressure differences occurring on the outside of the housing 22 will cause the diaphragm 28 to reciprocate the body 30 in the direction of the arrow 34 with the result that a pulsating induction voltage is generated in the coil 32.

The invention is not limited to the exemplary embodiments described above with reference to the figures, but comprises all kinds of modifications, of course as far as falling within the scope of protection of the following claims. Thus, it is possible that a temperature sensor is assembled with each of the conductivity sensors, so that the conductivity and temperature of the milk from each udder quarter can be measured separately, so that a latent mastitis can be determined in a very reliable manner, since it manifests itself both in a higher conductivity of the milk and in a higher temperature. The result of the processing of the conductivity data and the temperature data may be interrelated with each other.

What is claimed is:

1. A device for analyzing milk to determine at least one of the health of milk animals and the quality and composition of the milk obtained from the animals, the device comprising a milking circuit which forms part of a milking machine and is connected to the milking cups adapted for connection to the teats of the animals, in which milking circuit sensors are disposed within a housing to determine parameters relevant to at least one of the health of the animals and the quality and composition of the milk, the device further comprises data processing means adapted to process signals determining the parameters and provided by the sensors and to make knowable the processing results thereof, the data processing means being included with the housing of the sensors.

2. A device according to claim 1, wherein the housing of the sensors and the data processing means includes transmitting means for transmitting the resulting data to receiving means installed elsewhere.

3. A device according to claim 1, wherein the housing for one or more sensors and for the data processing means is formed by a milk claw.

4. A device according to claim 3, wherein at least adjacent to a place where each of the milk lines from the relevant milking cups opens into the milk claw there is arranged at least one sensor to be contacted with the milk from a relevant udder quarter, which sensor is electrically connected to the data processing means fixed to the wall of the milk claw.

5. A device according to claim 4, wherein the place where the milk lines from the milking cups open into the milk claw the sensors are formed by a conductivity sensor and a temperature sensor.

6. A device according to claim 5, wherein the conductivity sensor and the temperature sensor form one whole.

7. A device according to claim 4, wherein the data processing means are arranged on the inside of the upper wall of the milk claw and one or more further sensors to be contacted with the mixed milk are disposed below the data processing means.

8. A device according to claim 7, wherein each of the sensors located where the milk lines from the milking cups open into the milk claw is formed by a conductivity sensor and the sensor disposed below the data processing means is formed by a temperature sensor.

9. A device according to claim 3, wherein the data processing means are arranged on the inside of the upper wall of the milk claw, while on the side thereof, below the opening of each of the milk lines from the four milking cups into the milk claw, a sensor is arranged.

10. A device according to claim 1, wherein the housing includes a supply source without an external supply lines.

11. A device according to claim 10, wherein the supply source is arranged to generated, in use, electric energy on the basis of one of pulsating air and gas pressure differences in the housing.

12. A device according to claim 11, further comprising a solid body which is moved on the basis of said one of air and gas pressure differences and, while being moved, generates electric energy in an electromagnetic manner.

13. A milk claw comprising the device according to claim 1.

* * * * *

UNITED STATES PATENT AND TRADEMARK OFFICE
CERTIFICATE OF CORRECTION

PATENT NO. : 6,378,455 B1
DATED : April 30, 2002
INVENTOR(S) : Postma et al.

It is certified that error appears in the above-identified patent and that said Letters Patent is hereby corrected as shown below:

<u>Title page,</u>
Item [73], please change the Assignee section as follows:

-- [73]   Assignee:   N.V. Nederlandsche Apparatenfabriek NEDAP --.

Signed and Sealed this

Twenty-third Day of July, 2002

Attest:

Attesting Officer

JAMES E. ROGAN
*Director of the United States Patent and Trademark Office*